United States Patent
Walter et al.

(10) Patent No.: US 9,067,560 B2
(45) Date of Patent: Jun. 30, 2015

(54) TRIM PART WITH AN AIRBAG COVER AND A METHOD FOR MANUFACTURING A TRIM PART

(71) Applicant: Faurecia Innenraum Systeme GmbH, Hagenbach (DE)

(72) Inventors: Michael Walter, Karlsruhe (DE); Wolfram Bühler, Durlach/Aue (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 0 days.

(21) Appl. No.: 14/141,556

(22) Filed: Dec. 27, 2013

(65) Prior Publication Data

US 2014/0186567 A1    Jul. 3, 2014

(30) Foreign Application Priority Data

Dec. 28, 2012  (EP) .................................. 12199659

(51) Int. Cl.
| | |
|---|---|
| *B32B 3/14* | (2006.01) |
| *B32B 7/02* | (2006.01) |
| *B60R 21/16* | (2006.01) |
| *B60R 21/20* | (2011.01) |

(Continued)

(52) U.S. Cl.
CPC ........... *B60R 21/2165* (2013.01); *Y10T 156/10* (2015.01); *Y10T 428/15* (2015.01); *B29L 2031/3008* (2013.01)

(58) Field of Classification Search
CPC .. B60R 21/207; B60R 21/215; B60R 21/216; B60R 2021/2074; B60R 2021/2076; B60R 2021/2078; B60R 2021/21512; B60R 2021/21518; B60R 2021/21525; B60R 2021/21531; B60R 2021/21537; B60R 2021/21543; B32B 2605/00; Y10T 56/10; Y10T 428/15; B29L 2031/3008
USPC ......... 428/32, 43, 57–62, 121–124, 130–131; 280/730.2, 743.1; 296/136.01–136.02
See application file for complete search history.

(56) References Cited

U.S. PATENT DOCUMENTS

| | | | |
|---|---|---|---|
| 6,131,945 | A | 10/2000 | Labrie et al. |
| 6,170,859 | B1 | 1/2001 | Kausch |

(Continued)

FOREIGN PATENT DOCUMENTS

| | | |
|---|---|---|
| DE | 19633109 A1 | 2/1997 |
| DE | 19735438 A1 | 2/1999 |

(Continued)

OTHER PUBLICATIONS

DE 10241930 A1 Machine Translation.*

(Continued)

*Primary Examiner* — Prashant J Khatri
*Assistant Examiner* — Travis Figg
(74) *Attorney, Agent, or Firm* — Faegre Baker Daniels LLP

(57) ABSTRACT

The method relates to a trim part with an airbag cover, in particular for use in a motor vehicle, comprising a carrier and a haptics layer which are weakened along a tear line delimiting the airbag cover, and a decor layer of leather which covers the carrier and the haptics layer, wherein additionally a reinforcement layer is arranged between the haptics layer and the decor layer. According to the invention, the decor layer and the reinforcement layer have a constant thickness. The invention also relates to a method for manufacturing such a trim part.

9 Claims, 3 Drawing Sheets

(51) Int. Cl.
*B60J 7/20* (2006.01)
*B62D 25/06* (2006.01)
*B60R 21/2165* (2011.01)
*B29L 31/30* (2006.01)

(56) References Cited

U.S. PATENT DOCUMENTS

| | | | |
|---|---|---|---|
| 7,165,781 | B2 | 1/2007 | Cesar |
| 7,810,836 | B2 * | 10/2010 | Muller et al. ............. 280/728.2 |
| 7,980,587 | B2 | 7/2011 | Chen et al. |
| 8,157,289 | B2 | 4/2012 | Bittner et al. |
| 8,177,255 | B2 | 5/2012 | Le Hoang et al. |
| 2005/0127641 | A1 | 6/2005 | Cowelchuk et al. |
| 2006/0185568 | A1 * | 8/2006 | Kuttner et al. ............ 112/475.02 |
| 2007/0080521 | A1 | 4/2007 | Leserre et al. |
| 2007/0113968 | A1 * | 5/2007 | Lutze et al. ................ 156/272.8 |
| 2011/0181028 | A1 | 7/2011 | Brunet |

FOREIGN PATENT DOCUMENTS

| | | | | |
|---|---|---|---|---|
| DE | 10241930 A1 * | 3/2004 | ............. | B60R 21/20 |
| DE | 10244311 A1 * | 4/2004 | ............. | B60R 13/02 |
| EP | 1745989 B1 | 1/2007 | | |
| JP | 07285406 A | 10/1995 | | |

OTHER PUBLICATIONS

DE 10244311 A1 Machine Translation.*
"Air bag door for vehicle instrument panel", Research Disclosure, Mason Publications, Hampshire, GB, Apr. 1, 1995, ISSN: 0374-4353.
International Search Report and Written Opinion issued in PCT/EP2008/009831, dated Feb. 5, 2009, with English Translation, 24 pages.

* cited by examiner

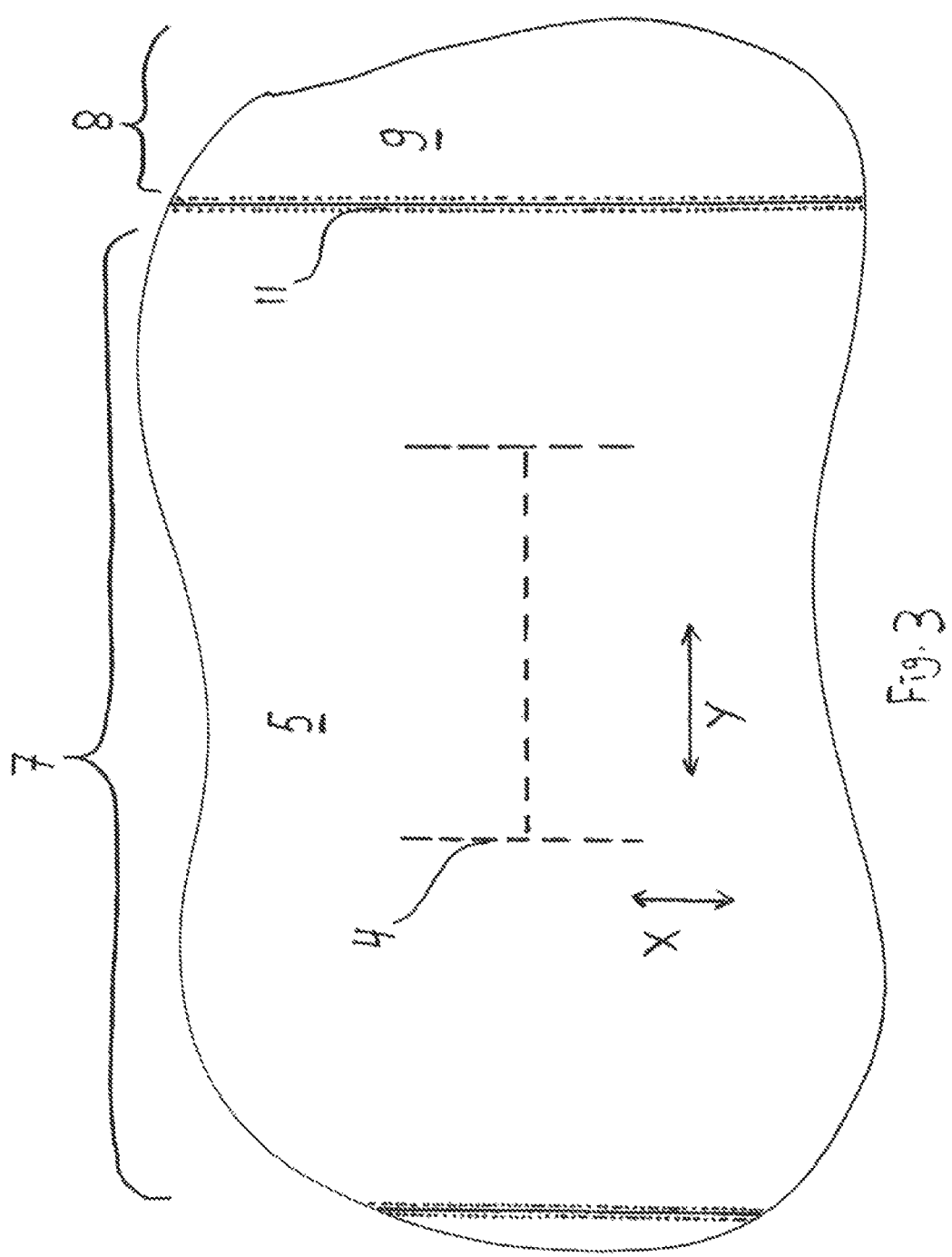

TRIM PART WITH AN AIRBAG COVER AND A METHOD FOR MANUFACTURING A TRIM PART

CROSS-REFERENCE TO RELATED APPLICATION

This application claims priority to European Application No. 12199659.9, filed Dec. 28, 2012, which is herein incorporated by reference in its entirety.

BACKGROUND

The present invention relates to a trim part with an airbag cover, in particular for use in motor vehicles, with a carrier, a haptics layer and a decor layer of leather which covers the haptics layer and the carrier, according to the preamble of the main claim. The invention also furthermore relates to a method for manufacturing such a trim part.

Airbag covers with an invisible tear line are known from the state of the art, for example from the document EP 1745989 B1. With airbag covers of this type, a local weakening is incorporated into a leather decor layer, in order to ensure a controlled folding-open of the airbag flap along a tear line. As has been ascertained, it is however difficult to ensure that the tear line remains invisible on a viewed side of the airbag cover and does not become apparent there over time, even with an ageing of the decor layer.

SUMMARY

It is the object of the present invention, to develop a comparable trim part with an airbag cover which cannot be recognised as such, wherein a tear line for the airbag should remain invisible after an ageing of the trim part. It is further an object of the invention to provide a method for manufacturing a trim part with these characteristics.

According to the invention, this object is achieved by a trim part with the features of the main claim as well as by a method with the features of the auxiliary claim. Advantageous designs of the invention are to be deduced from the features of the dependent claims.

The suggested trim part with an airbag cover, in particular for use in a motor vehicle, comprises a carrier and a haptics layer which are weakened along a tear line delimiting the airbag cover, and a decor layer of leather which covers the carrier and the haptics layer, wherein additionally a reinforcement layer is arranged between the haptics layer and the decor layer. According to the invention thereby, the decor layer and the reinforcement layer both each have a constant thickness, thus are designed without a local weakening along the tear line.

A visible local change of the surface of the decor layer is avoided on ageing, for example due to temperature changes, air humidity, drying-out, shrinkage or sun exposure, due to the constant thickness of the decor layer and of the reinforcement layer located therebelow, so that the tear inner remains invisible over the longer term. Hereby, the reinforcement layer provided between the decor layer and the haptics layer stabilises the decor layer and permits the decor layer as a whole to be designed in such a thin manner that a controlled tearing of the airbag cover is ensured.

A constant thickness of the decor layer is simpler to realise than a local weakening in the decor layer, said weakening running along the tear line. Further processing steps are necessary for a local weakening in the decor layer. Expensive and time-consuming steps in the processing or machining procedure are avoided due to the constant thickness of the decor layer. Moreover, dimensions of split leather are easier to adhere to on account of this.

Moreover, the decor layer and the reinforcement layer only extend over a part region of the trim part. The trim part comprises a surface decor which is arranged over the carrier and the haptics layer and which in this part region is formed by the mentioned cover layer and the reinforcement layer and in at least one region adjacent the part region is formed by another ply of leather. A composite of the decor layer and reinforcement layer has a thickness which corresponds to the thickness of the mentioned ply of leather. A composite of the decor layer and of the reinforcement layer has a thickness which corresponds to the thickness of the mentioned ply of leather. A homogenous thickness of the surface decor extending over the part region and the at least one region adjacent thereto results by way of this. An optical difference and a conspicuous jump in height between the part region and the adjacent region is avoided by way of this, without the haptics layer for this having to be designed differently in the mentioned part region and the at least one region adjacent thereto. In the context of the present document, layers or plies or composites thereby are also indicated as still being of the same or corresponding thickness, even if their thicknesses differ from one another slightly, but not more than 20%—in preferred embodiments not more that 10%, in particularly preferred embodiments not more that 5%. From that which has been said, it results that the thickness of the decor layer of leather in the mentioned part region is smaller than the thickness of the individual ply of leather which in the at least one adjacent region forms the surface decor. The part region typically extends at least over a region of the airbag cover.

The decor layer and the reinforcement layer can be bonded into a composite. Hereby, it is particularly advantageous if a bonding connection between the decor layer and the reinforcement layer is so strong, that the mentioned composite tears along the tear line given a tensile loading which can be caused by an airbag release, without the bonding connection being released. A tearing of the composite along the tear line is supported by way of this. A further advantage of a bonding of the decor layer to the reinforcement layer lies in the fact that the composite can be simply sewn to the ply.

Also a surface layer of leather which is particularly simple to process or machine is provided with the described measures and with the composite of decor layer and reinforcement layer, and even if the leather decor layer is reduced to an extremely thin residual thickness, this surface layer has the same thickness as a conventional decor of real leather, but a lower tear force than this. Moreover, compared to conventional manufacturing methods for surface decors of leather which are suitable for the cover of airbag openings, it is significantly simpler for the manufacture, if a textile is bonded behind a large surface of split leather, in order to provide the composite with the desired characteristics. This composite does not need to be weakened in an elaborate manner, and specially designed tearing-locations are not necessary here. Indeed in contrast, it is sufficient if the carrier and the haptics layer display a local weakening along the tear line, with the described design of the composite of a leather decor layer and typically textile reinforcement layer.

Advantages when applying the described composite also result with further processing, thus on laminating the airbag cover. Since neither the leather decor layer nor the reinforcement layer are provided with a local weakening, specifically it is also not necessary to carefully apply weakened tear lines carefully over one another, i.e. to bring a perforation in the decor into congruence with the weakening in the haptics layer and carrier. The complete leather textile composite can thus be applied over the airbag cover in a simple manner. The working step for applying the leather decor onto the trim part is therefore less time-consuming and thus more economical.

A secure opening of the airbag cover and a controlled tearing of the trim part including the composite in the case of an airbag release is ensured despite this, since the tensile forces within the composite are significantly greater where the haptics layer lying therebelow is weakened, than at other locations where the composite is connected to the haptics layer. This is also the reason why a local weakening of the decor layer itself and also a local weakening of the so-called reinforcement layer along the tear line is indeed not necessary.

With the previously described design, with which the decor layer backed with a reinforcement layer only covers a part region, the composite covering the part region can be connected, in preferred embodiments sewn, to the ply covering the adjacent region, without further measures having to be taken in order to achieve a homogeneous thickness of the complete trim art. The surface decor, consisting of the composite and the ply, can moreover be simply deposited onto the haptics layer.

According to some preferred embodiments, the tear resistance of the composite is lower than the tear resistance of the ply. A controlled tearing of the airbag cover is ensured by way of this, also without a local weakening of the decor layer. The tear strength of a two-dimensional formation or sheet formation is thereby defined as the force which is to be applied onto a plane defined by the two-dimensional formation, in order to let this tear over a certain length transversely to the pull direction, divided by this length.

According to some preferred embodiments, the reinforcement layer can have at least one preferred tear direction, along which it tears more easily than along other directions, wherein the tear line in the carrier and the haptics layer, at least in a section, runs parallel to the preferred tear direction or parallel to one of the preferred tear directions. A controlled tearing of the airbag cover along the tear line can also be favoured by way of this. If the tear line is U-shaped or H-shaped, as is often the case, then the reinforcement layer or the composite can be arranged or laminated-on, in a manner such that the tear line runs parallel to one of the preferred tear directions at least almost everywhere. Typically, specifically there will be two preferred tear directions which are perpendicular to one another and which are e.g. defined by a direction of warp threads and weft threads.

The reinforcement layer can be manufactured of a different material than the decor layer. The reinforcement layer thus preferably does not consist of leather. In some particularly preferred embodiments, the reinforcement layer consists of a textile, for example of a woven fabric. Then a direction of warp threads and/or weft threads of the woven fabric can in each case define a preferred tear direction, along which the reinforcement layer tears more easily than along other directions. As long as the fabric is orientated such that the tear line at least in sections runs parallel to the warp threads and/or parallel to the weft threads, then one can ensure particularly well that the trim part tears along the tear line in a controlled manner in the case of an airbag release, in order to permit an accordingly controlled tearing of the airbag cover.

Irrespective of what sort of textile is used for the reinforcement layer in the individual case, one should take care that this in a direction perpendicular to the layer plane does not tear more poorly or at all events at least not significantly more poorly than along a tear line—in particular along the at least one preferred tear direction—in the layer plane. Woven fabrics are therefore far better suitable than e.g. non-wovens or knitted fabrics, which due to an extensive isotropy can also tear in the z-direction (x-direction and y-direction here are defined as spanning the layer plane). The tearing in the z-direction—in particular also with the occurrence of tensile and shear forces, as are to be expected with an airbag release—should be avoided finally for the same reason as the release of the bonding connection between the reinforcement layer and decor layer, so that the—large-surfaced, very thin—decor layer specifically tears in a controlled manner only where the layer lying therebelow is weakened, and at other locations experiences adequate support by way of the layers lying therebelow.

The tear strength of the composite with a loading perpendicular to the preferred tear direction or perpendicularly to at least one of the preferred tear directions in preferred embodiments is less than 880 N/5 cm. In particularly preferred embodiments, this tear strength has a value of smaller than 700 N/5 cm. Typically, the tear strength is greater than 380 N/5 cm.

The reinforcement layer e.g. can be selected such that its tear strength given a loading perpendicular to the preferred tear direction or perpendicular to at least one of the preferred tear directions is smaller than 300 N/5 cm. In preferred embodiments, the tear strength of the reinforcement layer given a loading perpendicular to at least one of the preferred tear directions is not more than 180 N/5 cm. This tear resistance of the reinforcement layer, however, is typically greater than 90 N/5 cm.

As to how thinly the decor layer is to be designed in the mentioned part region depends on the quality of the applied leather. The thickness of the decor layer which is thinner compared to the ply of leather in the at least one region adjacent the part region is to be selected such that a tearing of the airbag cover is ensured given a release of the airbag. In typical designs, the thickness of the decor layer at the most is 0.7 mm. According to preferred embodiments, the reinforcement layer has a thickness of at least 0.4 mm. The thickness of the decor layer can for example be between 0.5 mm and 0.7 mm. For this, a starting material for the decor layer can be reduced uniformly in its thickness. The reinforcement layer with typical designs can have a thickness for example of between 0.6 mm and 0.4 mm.

A method for manufacturing a trim part with an airbag cover is also provided with the present invention. This method comprises the steps of reducing a thickness of a decor layer of leather, furthermore bonding the decor layer to a reinforcement layer into a composite, in which the decor layer as well as the reinforcement layer each have a constant thickness, moreover applying a haptics layer onto a carrier, the provision of a weakening along a tear line delimiting the airbag cover, in the carrier and in the haptics layer, as well as applying the composite of the decor layer and reinforcement layer onto the haptics layer. Thus with comparatively little effort, one obtains a trim part with an airbag cover which meets the demands outlined above. This method in particular is suitable for manufacturing a trim part according to the previously described type.

In one advantageous design of the method according to the invention, the composite is applied onto the haptics layer such that a preferred tear direction or one of two preferred tear directions of the reinforcement layer, at least in a section runs parallel to the tear line.

According to the invention, the composite as part of a greater surface decor is applied onto the haptics layer. This part only extends over a part region of the trim part, and the surface decor in at least one region adjacent this part is formed by a leather ply, wherein the ply has a thickness which corresponds to a thickness of the composite.

In a preferred method, the composite is connected to the ply, preferably by way of sewing, before applying onto the haptics layer.

The thickness of the decor layer according to preferred embodiments is reduced to a constant value of 0.7 mm or less, preferably before bonding to the reinforcement layer. According to various preferred embodiments, the thickness of the decor layer before the bonding to the reinforcement layer is reduced to a constant value between 0.5 mm and 0.7 mm Concluding, in particular the following advantages are achieved with the embodiments of a trim part with a leather decor layer:

The manufacture of the composite of weakened leather and textile layer is already simple and inexpensive.

The composite of the leather decor layer and reinforcement layer or textile layer has no local weakening, neither in the textile nor in the leather, which saves at least one working step compared to conventional solutions.

The composite surface consists of leather, which can exhibit no local signs of ageing, by way of which a tear line could become visible over time.

The tensile force or tear strength of the composite material is such that the airbag can open, and specifically despite the use of a natural product leather for the decor layer and despite the absence of a local weakening in this decor layer. This advantage is of utmost significance, since the natural product leather never has completely homogenous characteristics, and stability differences always occur from skin to skin and thus from example to example of the trim part of a certain type. The realisation of a controllable tear line in a trim part with a leather surface thus also entails overcoming a particularly difficultly.

The laminating-on of this composite requires less effort on manufacture of the component, since less tear lines are to be applied over one another.

The composite described of a decor layer and reinforcement layer and which is described here, in view of the foregoing, is thus particularly well suitable for the applications for laminating an airbag cover.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

Embodiment examples of the invention are explained by way of the attached drawings:

FIG. 3 shows a plan view of a section of a trim part, according to another embodiment of the invention.

Figure 1:
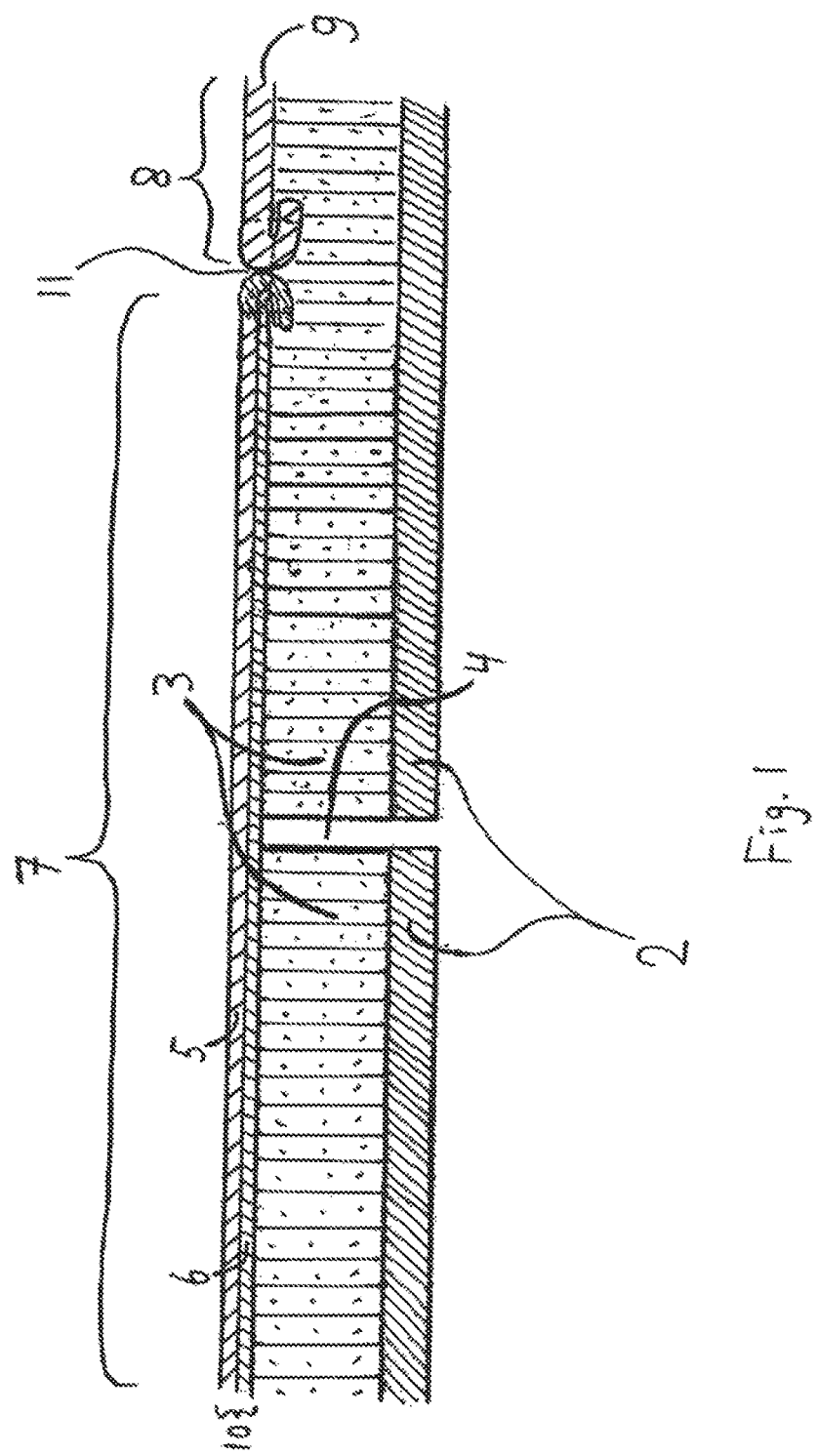
FIG. 1 shows a cross section through a trim part according to one embodiment of the invention.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

FIG. 1 shows a cross section of a trim part. The trim part comprises a carrier 2 of plastic, with which it is the case of an instrument panel of a motor vehicle, and a haptics layer 3 which is formed e.g. from a knitted fabric or a foamed material. The carrier 2 and the haptics layer 3 are weakened along a tear line 4 delimiting the airbag cover. The trim part at a viewed side comprises a surface decor. The surface decor at the viewed side, within a part region 7 is formed by a decor layer 5 of leather which is thinned out over the whole surface to a thickness of approx. 0.6 mm. Additionally, a reinforcement layer 6 with a thickness of approx. 0.5 mm and which is bonded to the decor layer 5 and thus forms a composite 10 with this, is arranged between the decor layer 5 and the haptics layer 3. With regard to the reinforcement layer 6 it is the case of a woven fabric. The decor layer 5 and the reinforcement layer 6 only extend over a part region 7 of the trim part. The surface decor in a region 8 which is adjacent the part region 7 is formed by a ply 9 which there lies on the haptics layer 3. The ply 9 also consists of leather, preferably of the same leather as the decor layer 5, and is only split less far downwards in its thickness. The thickness of the ply 9 thereby corresponds to the thickness of the composite of the decor layer 6 5 and the reinforcement layer 6 and is about 1.1 mm. The composite 10 has a lower tear strength that the ply 9.

Figure 2:
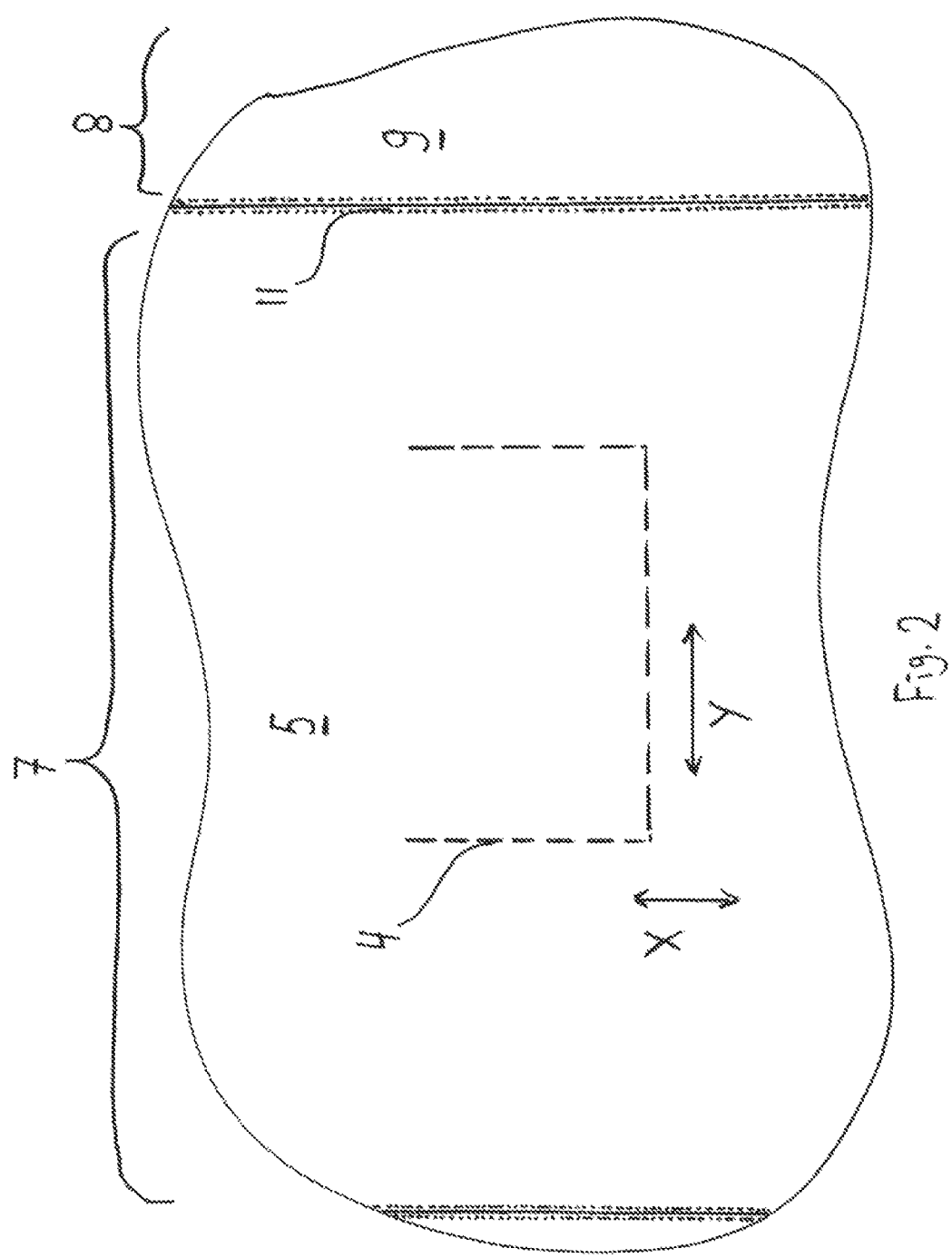
FIG. 2 shows a plan view of a section of this trim part.

FIG. 2 shows a plan view of the trim part. What is recognisable there is the part region 7 which comprises the airbag cover. The on airbag cover forming an airbag flap is delimited by the tear line 4 at three sides. The tear line 4 here is represented in a dashed manner. The composite 10 is sewn to the adjacent ply 9. A seam 11 thus forms a border between the part region 7 and the adjacent region 8. As is indicated in FIG. 2, also further parts of the surface decor can be sewn on the composite of the decor layer 5 and reinforcement layer 6 in a similar manner.

The reinforcement layer 6 consists of a woven fabric, whose warp threads and weft threads define two preferred tear direction, which in FIG. 2 are in each case indicated by a double arrow X and Y respectively. The reinforcement layer 6 can tear more easily along these tear directions than along other directions. The tear strength of the composite 10, given a loading in the direction of the warp threads or weft threads is 650 N/5 cm and 630 N/5 cm respectively. The tear strength of the reinforcement layer 6 given a loading in the direction of the weft threads or warp threads is 220 N/5 cm and 110 N/5 cm respectively. As is recognisable in FIG. 2, the tear line 4 in sections runs in each case parallel to one of the preferred tear directions X or Y. The tear line 4 has a U-shaped course in the example.

FIG. 3 shows a plan view of a trim part according to another embodiment which differs only from the previously described embodiment example in that the tear line 4 has a different course. Recurring features in this figure are provided with the same reference numerals as in the preceding FIGS. 2 and 3. The tear line 4 here has an H-shaped course, so that the airbag cover in this case forms a two-winged airbag flap. The weft threads lie parallel to the middle line of the H-shaped tear line, thus in the Y-direction.

Airbag flaps with differently running delimitations are also conceivable alternatively to the U-shape and H-shaped courses shown in FIGS. 2 and 3 respectively.

The trim parts shown in the figures are manufactured by way of the thickness of the decor layer 5 firstly being reduced to about 0.6 mm. Subsequently, the decor layer 5 is bonded to the reinforcement layer 6 into the composite 10, in which the decor layer 5 as well as the reinforcement layer 6 in each case have a constant thickness, thus being designed without local weakenings. Hereby, a bonding connection between the decor layer 5 and the reinforcement layer 6 is so strong that the mentioned composite 10 tears along the tear line 4, without the bonding connection releasing, if an airbag arranged below the airbag cover opens. The composite 10 is sewn to the ply 9 into the surface decor.

The haptics layer 3 is applied onto the carrier 2, wherein a weakening along the tear line 4 in the carrier 2 and in the haptics layer 3 is provided, for example by way of incisions or laser perforation. Subsequently the surface decor, consisting of the mentioned composite and the ply 9 is applied onto the haptics layer 3 such that the composite covers the airbag flap.

The weakening along the tear line 4 in the carrier 2 and in the haptics layer 3 can alternatively also be incorporated after the application of the decor layer 5 and the reinforcement layer 6.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

We claim:

1. A trim part with an airbag cover, in particular for use in a motor vehicle, comprising:
    a carrier and a haptics layer, which are weakened along a tear line delimiting the airbag cover; and
    a surface decor which is arranged over the carrier and the haptics layer, the surface decor being formed in a part region covering the tear line by a composite and in at least a region adjacent to the part region by a single ply of leather
    the composite being formed from:
        a decor layer of leather; and
        a reinforcement layer which is arranged between the haptics layer and the decor layer,
    wherein the decor layer and the reinforcement layer both have a constant thickness,
    wherein the thickness of the décor layer of the composite is smaller than the thickness of the single ply of leather, the single ply of leather having a thickness which corresponds to the thickness of the composite formed from the decor layer and the reinforcement layer.

2. The trim part of claim 1, wherein the composite of the reinforcement layer and the decor layer has a lower tear strength than the ply.

3. The trim part of claim 1, wherein the reinforcement layer has at least one preferred tear direction, along which it tears more easily than along other directions, wherein the tear line at least in a section runs parallel to the preferred tear direction or parallel to one of the preferred tear directions.

4. The trim part of claim 3, wherein the composite of the decor layer and reinforcement layer, with a loading perpendicular to the preferred tear direction or perpendicular to at least one of the preferred tear directions has a tear strength which is smaller than 880 N/5 cm, and/or that the reinforcement layer, with a loading perpendicular to the preferred tear direction or perpendicular to at least one of the preferred tear directions, has a tear strength which is smaller than 300 N/5 cm.

5. The trim part of claim 1, wherein the decor layer and the reinforcement layer are bonded into a composite.

6. The trim part of claim 5, wherein a bonding connection between the decor layer and the reinforcement layer is sufficiently strong that the composite with a tensile loading causable by an airbag release, tears along the tear line without the bonding connection releasing.

7. The trim part of claim 1, wherein the reinforcement layer is a textile layer.

8. The trim part of claim 1, wherein the thickness of the decor layer at the most is 0.7 mm and/or the thickness of the reinforcement layer is at least 0.4 mm.

9. The trim part of claim 7, wherein the reinforcement layer is a woven fabric.

* * * * *